US012036689B2

(12) United States Patent
Piper et al.

(10) Patent No.: US 12,036,689 B2
(45) **Date of Patent: *Jul. 16, 2024**

(54) PUNCH AND DRAW STUD HAVING MULTI-START THREADS, AND METHOD OF ENGAGING SAME

(71) Applicant: EMERSON PROFESSIONAL TOOLS, LLC, Elyria, OH (US)

(72) Inventors: Arthur A. Piper, Loves Park, IL (US); Robert Bentley, Columbia Station, OH (US); Andrew Troy, Chicago, IL (US); Ryan McManus, Peru, IL (US)

(73) Assignee: Emerson Profesional Tools, LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,393

(22) Filed: May 15, 2023

(65) Prior Publication Data

US 2023/0278249 A1 Sep. 7, 2023

Related U.S. Application Data

(63) Continuation of application No. 17/865,799, filed on Jul. 15, 2022, now Pat. No. 11,820,037.

(Continued)

(51) Int. Cl.

*B26F 1/14* (2006.01)
*B26F 1/38* (2006.01)

(52) U.S. Cl.

CPC ................ *B26F 1/14* (2013.01); *B26F 1/386* (2013.01); *B26F 2210/16* (2013.01)

(58) Field of Classification Search

CPC .................................. B26F 1/386; B26F 1/14
See application file for complete search history.

(56) References Cited

U.S. PATENT DOCUMENTS 4,495,699 A * 1/1985 Oakes .................. B21D 28/343 30/360
4,724,616 A * 2/1988 Adleman ............... B21D 28/34 30/360

(Continued)

FOREIGN PATENT DOCUMENTS

EP 2208553 A2 7/2010
JP 01310899 A 12/1989

OTHER PUBLICATIONS

"Multi-Start Thread Reference Guide", https://www.harveyperformance.com/in-the-loupe/multi-start-thread-guide/, 9 pages.

(Continued)

*Primary Examiner* — Sean M Michalski
(74) *Attorney, Agent, or Firm* — Klintworth & Rozenblat IP LLP

(57) ABSTRACT

A punch according to some embodiments of the disclosure includes a body having a punching edge and a wall forming a passageway therethrough, the wall having a multi-start thread formed thereon, and a draw stud according to some embodiments of the disclosure includes an elongated cylinder having a multi-start thread thereon which is configured to be coupled to the multi-start thread of the punch. The number of starts provided on the punch corresponds to the number of starts provided on the draw stud. The multi-start thread on the punch is engaged with the multi-start thread on the draw stud in use. A method using same to punch a hole in sheet metal is also provided.

23 Claims, 11 Drawing Sheets

Related U.S. Application Data

(60) Provisional application No. 63/228,339, filed on Aug. 2, 2021.

(56) References Cited

U.S. PATENT DOCUMENTS

| | | | | |
|---|---|---|---|---|
| 4,793,063 | A * | 12/1988 | Ducret | B26F 1/34<br>30/360 |
| 4,899,447 | A * | 2/1990 | Adleman | B21D 28/343<br>30/360 |
| 4,905,557 | A | 3/1990 | Adleman | |
| 6,266,886 | B1 * | 7/2001 | Tandart | B26D 5/10<br>30/360 |
| 6,647,630 | B1 | 11/2003 | Lucas et al. | |
| 6,772,521 | B2 | 8/2004 | Nordlin et al. | |
| 6,973,729 | B2 * | 12/2005 | Nordlin | B26F 1/14<br>30/360 |
| 6,981,327 | B2 * | 1/2006 | Nordlin | B21D 28/343<br>30/360 |
| 7,401,394 | B1 | 7/2008 | Mueller | |
| 10,835,944 | B2 * | 11/2020 | Nordlin | B26D 7/2614 |
| 11,584,624 | B1 * | 2/2023 | Christensen | B66F 3/44 |
| 11,820,037 | B2 * | 11/2023 | Piper | B26F 1/14 |
| 2005/0274033 | A1 * | 12/2005 | Kraemer | B26F 1/386<br>33/645 |
| 2009/0107675 | A1 * | 4/2009 | Eriksen | E21B 33/14<br>175/203 |
| 2010/0180744 | A1 | 7/2010 | Nordlin | |
| 2013/0145916 | A1 | 6/2013 | Nordlin | |
| 2013/0305544 | A1 * | 11/2013 | Haase | B26D 5/08<br>30/360 |
| 2015/0052735 | A1 | 2/2015 | Kochheiser | |
| 2015/0151349 | A1 * | 6/2015 | Nordlin | B23D 29/02<br>83/698.31 |
| 2017/0015016 | A1 * | 1/2017 | Myrhum, Jr. | B21D 28/343 |
| 2018/0281097 | A1 | 10/2018 | Jansma | |
| 2019/0383316 | A1 * | 12/2019 | Düll | F16B 37/00 |
| 2023/0030817 | A1 * | 2/2023 | Piper | B21D 28/34 |

OTHER PUBLICATIONS

International Search Report and Written Opinion for PCT/US2022/039026 dated Nov. 18, 2022, 12 pages.

Machine Translation of JP01310899 (A).

* cited by examiner

PUNCH AND DRAW STUD HAVING MULTI-START THREADS, AND METHOD OF ENGAGING SAME

CROSS-REFERENCE TO RELATED APPLICATION

This application is a continuation application of U.S. application Ser. No. 17/865,799 filed Jul. 15, 2022, which claims priority to U.S. provisional Application No. 63/228,339 filed on Aug. 2, 2021, the contents of which are incorporated herein in its entirety.

FIELD OF THE DISCLOSURE

The present disclosure relates to a draw stud having a multi-start thread for use with a punch having a multi-start thread, and methods of engaging same.

BACKGROUND

In the commercial electrical contractor market, many jobs start with installing conduit runs for connecting wires between electrical boxes. During installation, holes must be formed in electrical boxes and various other sheet metal components to feed the wire and conduit therethrough. A punch system is commonly used in this operation.

Some prior art punch systems include a draw stud, a die, a punch and a nut. The punch is seated on a first end of the draw stud and secured thereto by threading the nut onto the first end of the draw stud. The die is seated on a second end of the draw stud.

The operator drills a pilot hole approximately in the center of the area where the final hole needs to be located. The draw stud, which has been attached to a driver, has the die slid over its free end until the die abuts the driver. The draw stud is then inserted with its free end first through the pilot hole until the die is seated against one side of a sheet metal. The knockout punch, which has a central hole with internal threads, is seated onto the free end of the draw stud until the knockout punch impinges onto the side of the sheet metal opposite the side on which the die is located. The nut is then attached to the draw stud to secure the punch to the draw stud. As a result, the sheet metal is snugly captured on both sides by the die and punch. Finally, the driver is actuated such that the draw stud and the knockout punch are drawn toward the driver, supplying sufficient force to the knockout punch to puncture and cut the sheet metal and produce the final hole.

The driver is operated manually or hydraulically. Overall, this punch system works well, however, the most time consuming task is attaching the knockout punch onto the draw stud, which can take as long as thirty to sixty seconds to accomplish depending on the length of the draw stud. This can be frustrating and inefficient for the operator, especially when a great number of holes need to be punched.

SUMMARY

A punch according to some embodiments of the disclosure includes a body having a punching edge and a wall forming a passageway therethrough, the wall having a multi-start thread formed thereon, and a draw stud according to some embodiments of the disclosure includes an elongated cylinder having a multi-start thread thereon which is configured to be coupled to the multi-start thread of the punch. The number of starts provided on the punch corresponds to the number of starts provided on the draw stud. The multi-start thread on the punch is engaged with the multi-start thread on the draw stud in use.

A method of punching a hole includes forming a pilot hole in sheet metal, attaching a draw stud to a driver, sliding a die over a free end of the draw stud until the die is proximate to the driver, inserting the free end of the draw stud through the pilot hole until the die is seated against one side of the sheet metal and engaged with the driver, engaging a multi-start thread of a knockout punch with a multi-start thread of the draw stud, wherein a number of starts provided on the punch corresponds to a number of starts provided on the draw stud, rotating the knockout punch in a first direction to thread the knockout punch onto the free end of the draw stud until the knockout punch impinges onto a side of the sheet metal opposite the side on which the die is located, and actuating the driver to draw the draw stud and the knockout punch toward the die and to puncture and cut the sheet metal and produce a final hole.

This Summary is provided merely for purposes of summarizing some example embodiments so as to provide a basic understanding of some aspects of the disclosure. Accordingly, it will be appreciated that the above described example embodiments are merely, examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DESCRIPTION

Figure 1:
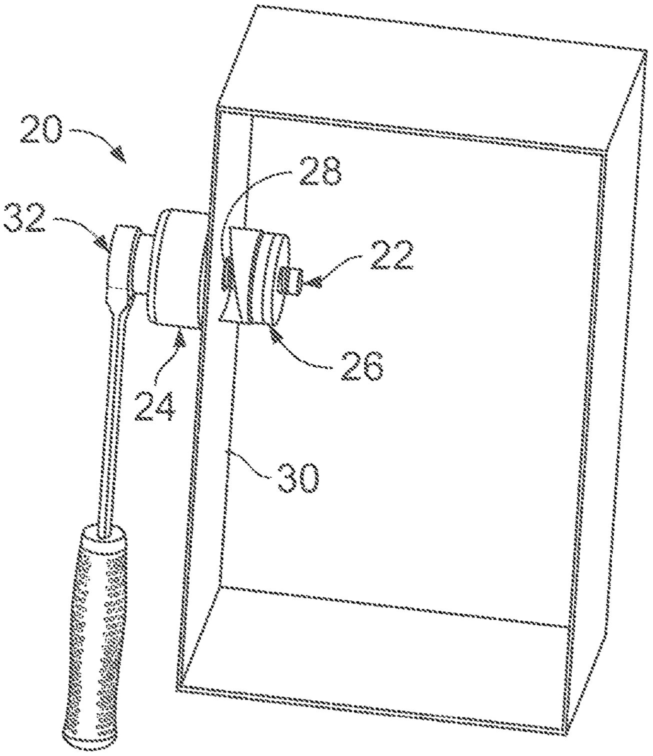
FIG. 1 depicts a perspective view of a punch system shown mounted to sheet metal.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 3:
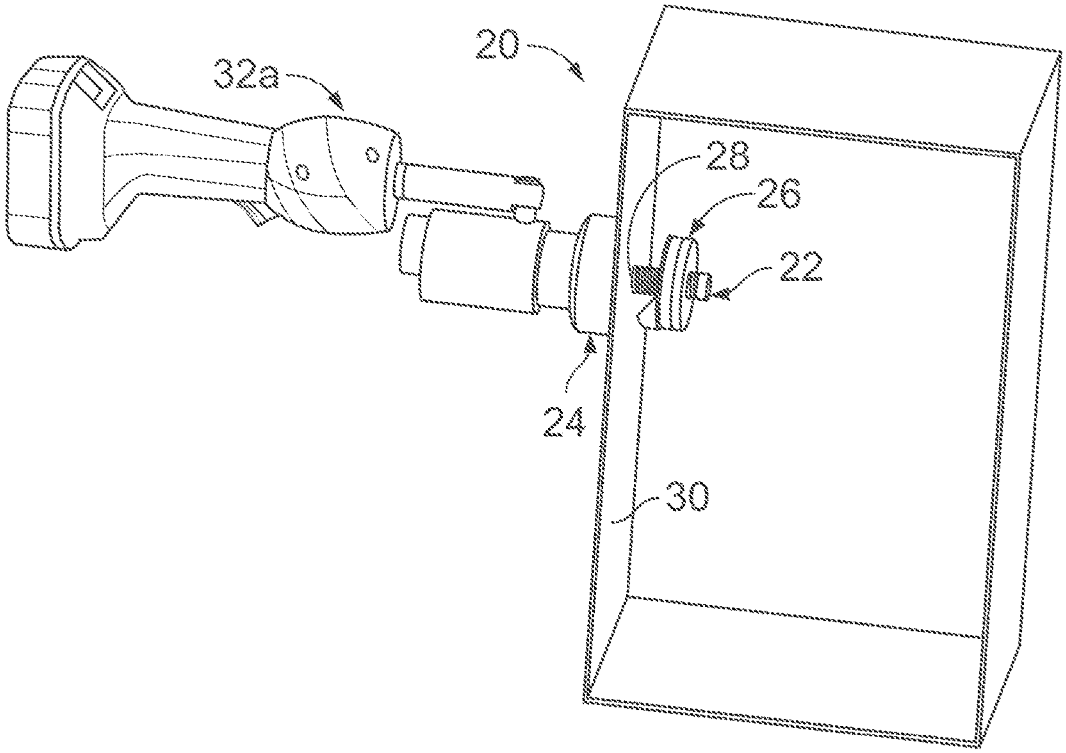
FIG. 3 depicts a perspective view of a punch system shown mounted to sheet metal.

As shown in FIGS. 1 and 3, a punch system 20 includes a draw stud 22, a die 24 mounted on the draw stud 22, and a knockout punch 26 mounted on the draw stud 22. In use, an operator drills a pilot hole 28 approximately in the center of an area in sheet metal 30 where the final hole needs to be located. The draw stud 22, which has been attached to a driver 32, **32*a*, has the die 24 slid over its free end until the die 24 is proximate to or abuts the driver 32, 32*a*. The draw stud 22 is then inserted with its free end first through the pilot hole 28 until the die 24 is seated against one side of the sheet metal 30. The knockout punch 26 is rotated in a first direction to thread the knockout punch 26 onto the free end of the draw stud 22 until the knockout punch 26 impinges onto the side of the sheet metal 30 opposite the side on which the die 24 is located. As a result, the sheet metal 30 is snugly captured on both sides by the die 24 and punch 26. Finally, the driver 32, 32*a* is actuated such that the draw stud 22 and the knockout punch 26 are drawn toward the die 24 and the driver 32, 32*a*, supplying sufficient force to the knockout punch 26 to puncture and cut the sheet metal 30 and produce the final hole. The punch system 20 of the present disclosure provides an efficient method to fasten the punch 26 onto the draw stud 22. When the draw stud 22 and the punch 26 are threaded together, the draw stud 22 and the punch 26 self-lock, which prevents the reverse rotation of the punch 26 (in a second direction which is opposite to the first direction) when the draw stud 22 and the punch 26 are drawn toward the driver 32, 32*a*. Because of the configuration of the attachment between the draw stud 22 and the punch 26, the use of a nut, as was done in the prior art, has been eliminated. In addition, the punch 26 is tightened onto the draw stud 22 in one motion. The reduction of components by the elimination of the prior art nut, and the action required to tighten the punch system 20** enhances the efficiency over the prior art.

The draw stud 22 has an elongated cylindrical body 34 and has an unthreaded cylindrical dog point 36 integrally formed therewith and extending longitudinally from a front end 38 thereof. The body 34 and the dog point 36 extending therefrom define a longitudinal centerline axis 40. The body 34 has a multi-start external thread 42, 142, 242 formed thereon which extends distally from the dog point 36, and a driver attachment 44, **44*a* extending proximally from a second end 46 thereof. The multi-start external thread 42, 142, 242 is configured to be coupled to the punch 26. The driver attachment 44, 44*a* is configured to be coupled to the driver 32, 32*a*. The draw stud 22 has a central section 48 extending between the multi-start external thread 42, 142, 242 and the driver attachment 44, 44*a***.

Figure 5:
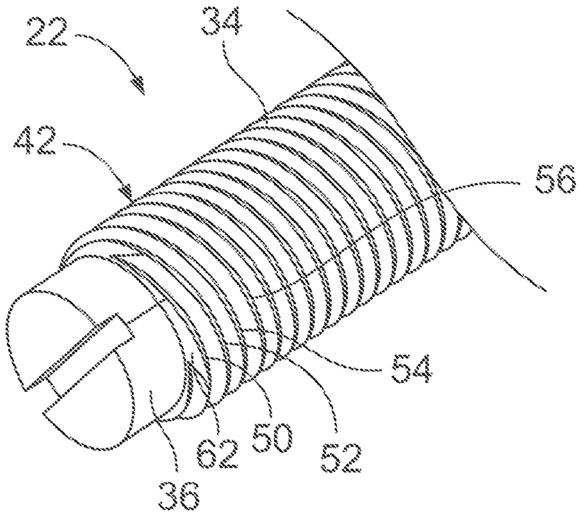
FIG. 5 depicts a perspective view of a portion of a draw stud of the punch system showing a four-start thread.
Figure 6:
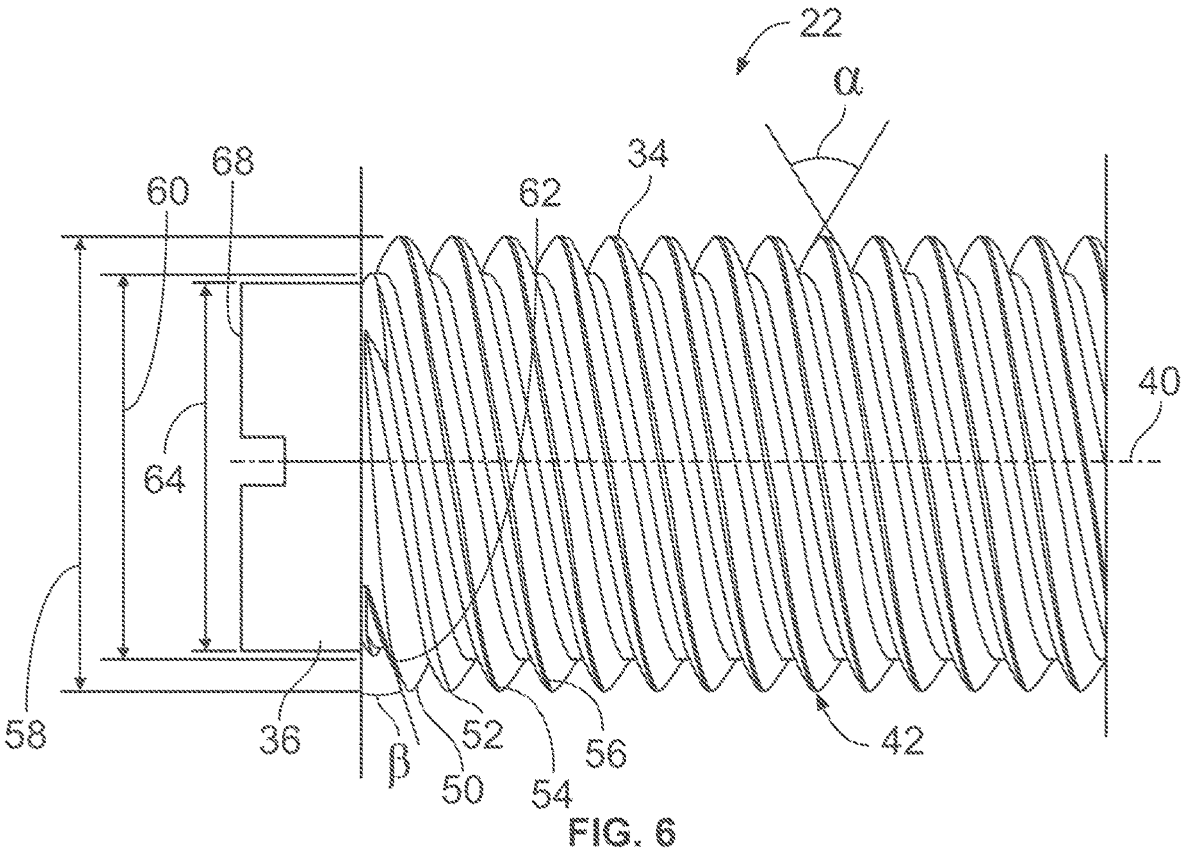
FIG. 6 depicts a side elevation view of a portion of the draw stud of FIG. 5.
Figure 7:
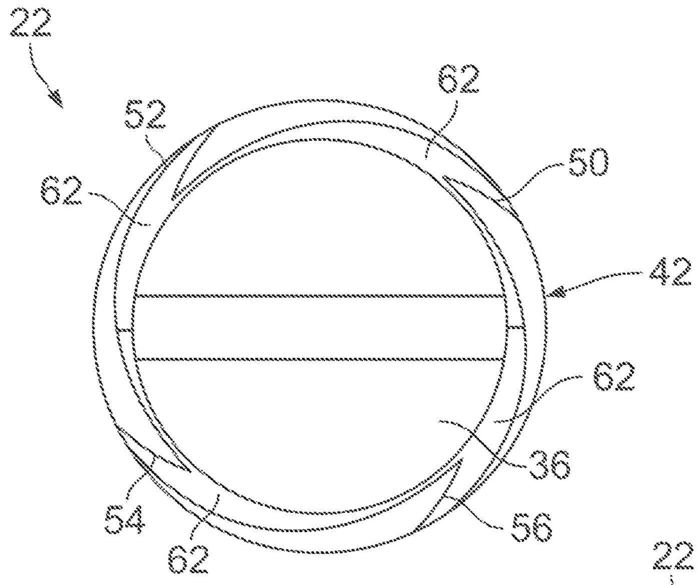
FIG. 7 depicts an end elevation view of the draw stud of FIG. 5.

As shown in the embodiment of FIGS. 5-7, the multi-start external thread 42 on the draw stud 22 has four intertwined coarse helical threads 50, 52, 54, 56, with the start of each thread 50, 52, 54, 56 being 90° apart from each other as best shown in FIG. 7. As shown in FIG. 6, each thread 50, 52, 54, 56 has thread angle α defined by a 60° included thread form. The threads 50, 52, 54, 56 define the same major diameter 58 along the portion of the draw stud 22 on which the threads 50, 52, 54, 56 are provided, and the same minor diameter 60 along the portion of the draw stud 22 on which the threads 50, 52, 54, 56 are provided. The major diameter 58 of the four intertwined coarse helical threads 50, 52, 54, 56, may be the same as the outer diameter of the central section 48, or may be less than the outer diameter of the central section 48. Each thread 50, 52, 54, 56 has a cone-shaped lead-in surface 62 which extends at an angle ß of 45°±5° relative to the centerline axis 40 when viewed in cross-section. The cone-shape of the lead-in surface 62 is interrupted by the starts of the threads 50, 52, 54, 56.

Figure 10:
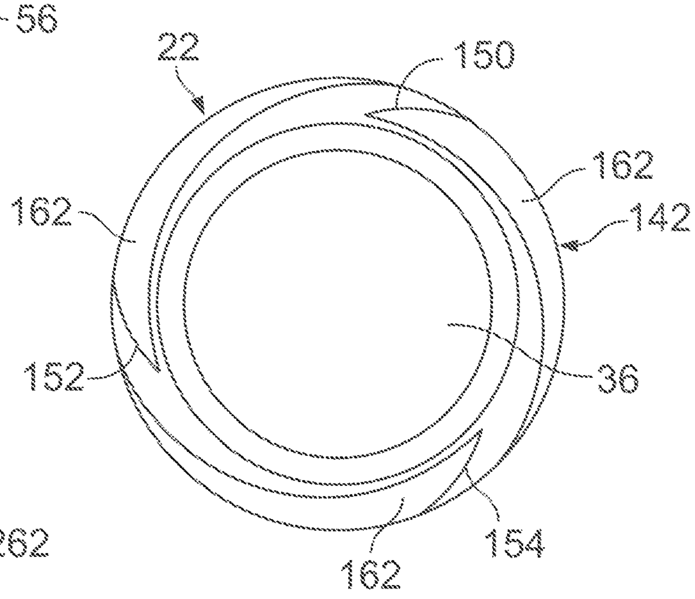
FIG. 10 depicts an end elevation view of the draw stud of FIG. 8.
Figure 8:
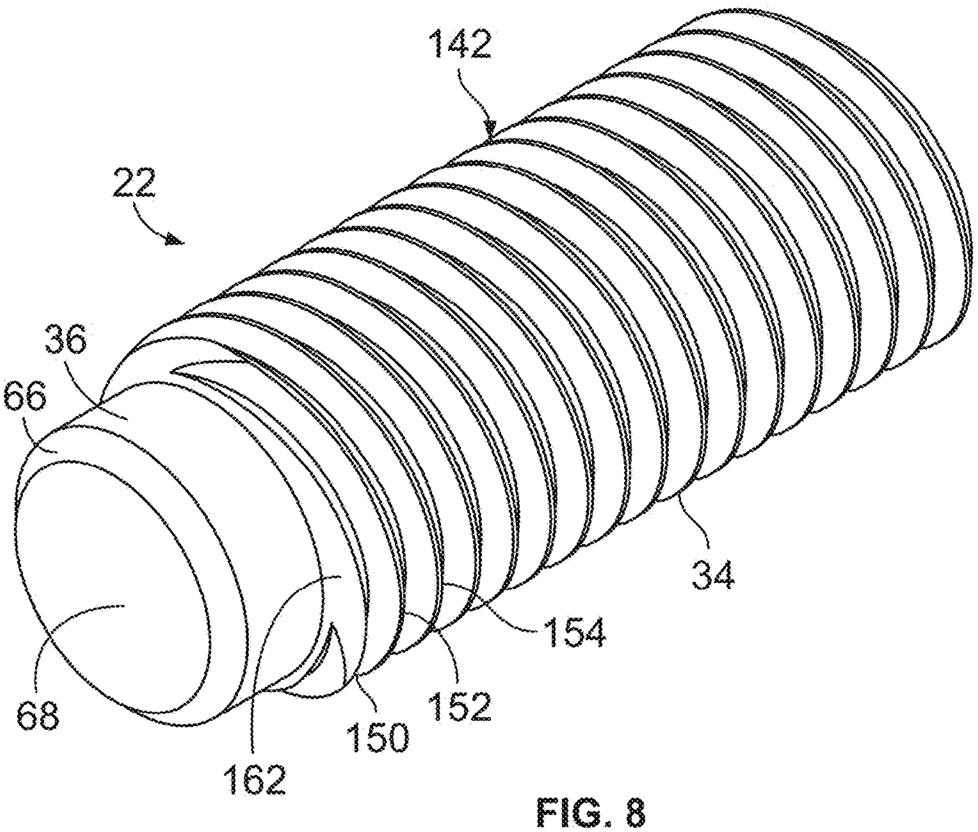
FIG. 8 depicts a perspective view of a portion of a draw stud of the punch system showing a three-start thread.
Figure 9:
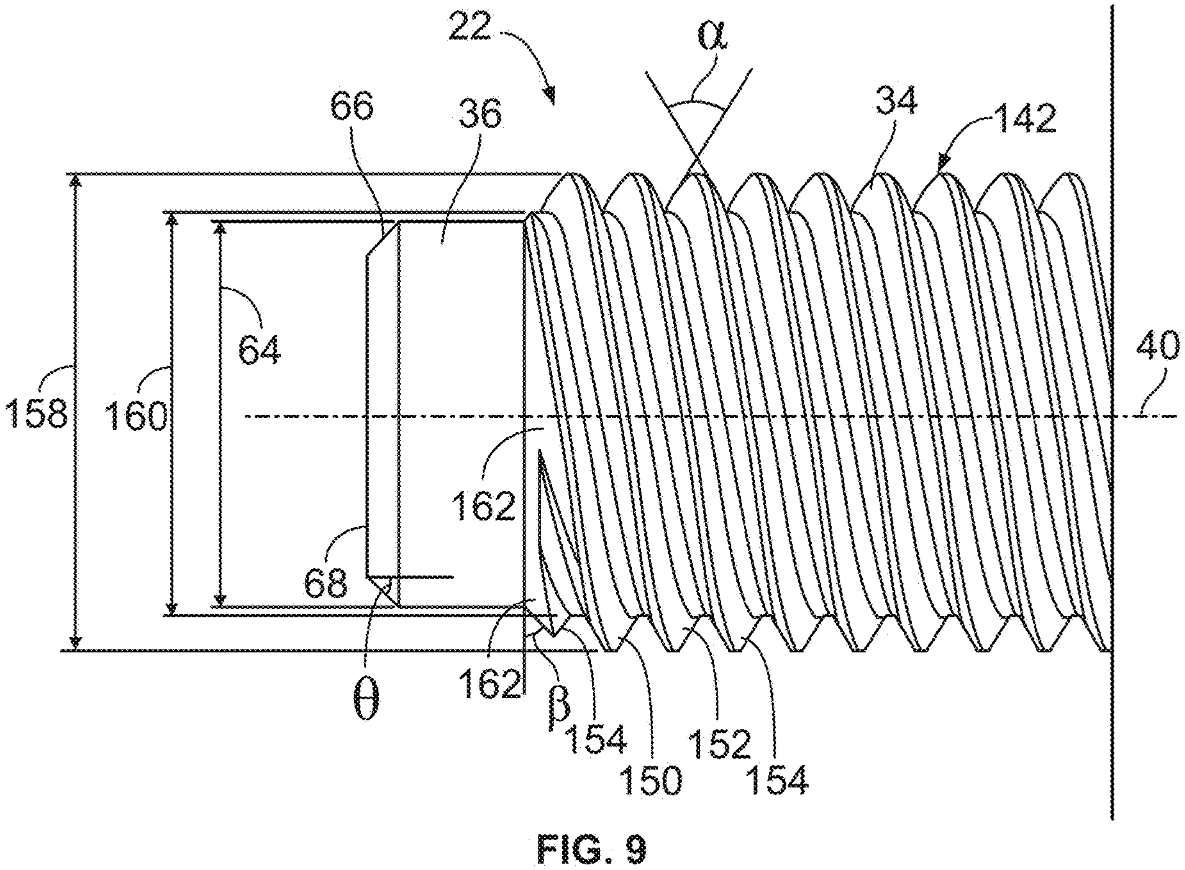
FIG. 9 depicts a side elevation view of a portion of the draw stud of FIG. 8.

As shown in the embodiment of FIGS. 8-10, the multi-start external thread 142 on the draw stud 22 has three intertwined coarse helical threads 150, 152, 154, with the start of each thread 150, 152, 154 being 120° apart from each other as best shown in FIG. 10. As shown in FIG. 9, each thread 150, 152, 154 has thread angle α defined by a 60° included thread form. The threads 150, 152, 154 define the same major diameter 158 along the portion of the draw stud 22 on which the threads 150, 152, 154 are provided, and the same minor diameter 160 along the portion of the draw stud 22 on which the threads 150, 152, 154 are provided. The major diameter 158 may be the same as the outer diameter of the central section 48, or may be less than the outer diameter of the central section 48. Each thread 150, 152, 154 has a cone-shaped lead-in surface 162 which extends at an angle ß of 45°±5° relative to the centerline axis 40 when viewed in cross-section. The cone-shape of the lead-in surface 162 is interrupted by the starts of the threads 150, 152, 154.

Figure 13:
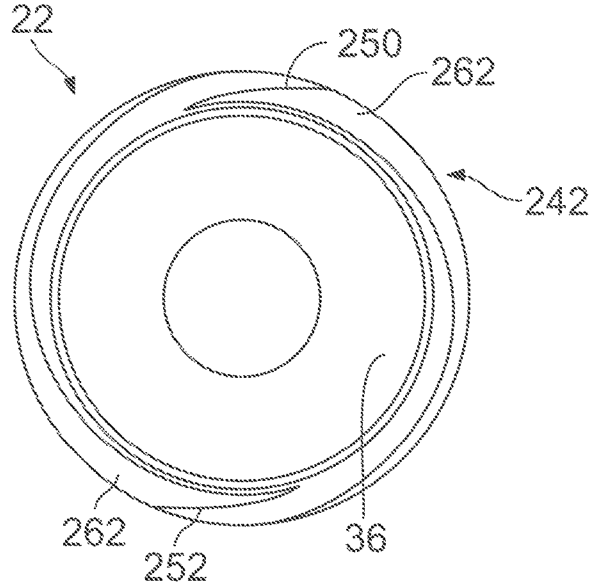
FIG. 13 depicts an end elevation view of the draw stud of FIG. 11.
Figure 11:
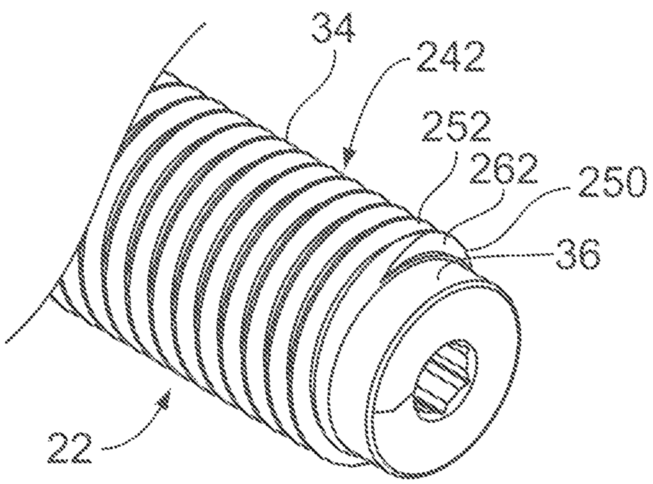
FIG. 11 depicts a perspective view of a portion of a draw stud of the punch system showing a two-start thread.
Figure 12:
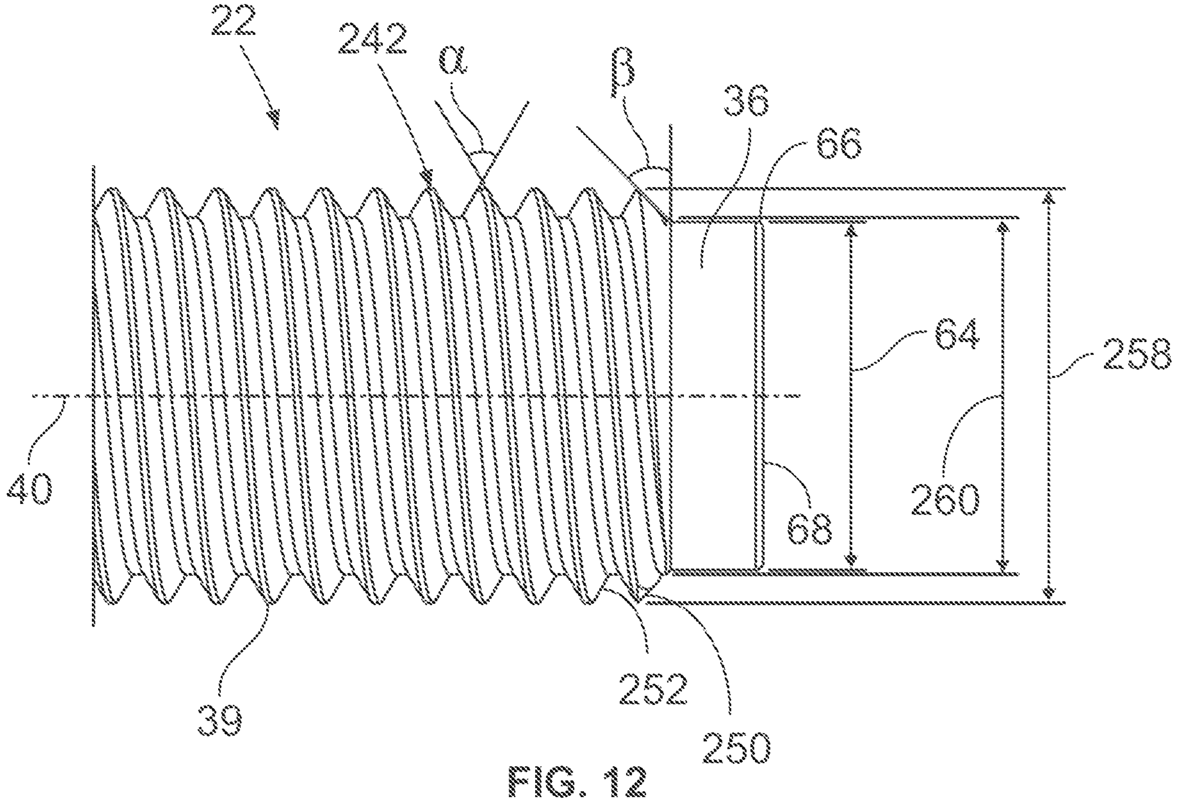
FIG. 12 depicts a side elevation view of a portion of the draw stud of FIG. 11.

As shown in the embodiment of FIGS. 11-13, the multi-start external thread 242 on the draw stud 22 has two intertwined coarse helical threads 250, 252, with the start of each thread 250, 252 being 180° apart from each other as best shown in FIG. 13. As shown in FIG. 12, each thread 250, 252 has a thread angle α defined by a 60° included thread form. The threads 250, 252 define the same major diameter 258 along the portion of the draw stud 22 on which the threads 250, 252 are provided, and the same minor diameter 260 along the portion of the draw stud 22 on which the threads 250, 252 are provided. The major diameter 258 of the two intertwined coarse helical threads 250, 252, may be the same as the outer diameter of the central section 48, or may be less than the outer diameter of the central section 48. Each thread 250, 252 has a cone-shaped lead-in surface 262 which extends at an angle ß of 45°±5° relative to the centerline axis 40 when viewed in cross-section. The cone-shape of the lead-in surface 262 is interrupted by the starts of the threads 250, 252.

In an embodiment, the multi-start external thread on the draw stud 22 has five intertwined coarse helical threads (not shown), with the start of each thread being 72° apart from each other.

The multi-start thread 42, 142, 242 limits the number of rotations required to secure the punch 26 into position on the draw stud 22 by increasing the linear distance traveled over a single rotation. A single start thread has a much smaller lead than a four-start thread per revolution, and a draw stud having a single start punch would require the punch to rotate at least four times more than the draw stud 22 having four starts as shown in FIGS. 5-7, to move the same linear distance. A single start thread has a much smaller lead than a three-start thread per revolution, and a draw stud having a single start punch would require the punch to rotate at least three times more than the draw stud 22 having three starts, as shown in FIGS. 8-10, to move the same linear distance. Likewise, a single start thread has a much smaller lead than a two-start thread per revolution, and a draw stud having a single start punch would require the punch to rotate at least two times more than the draw stud 22 having two starts, as shown in FIGS. 11-13, to move the same linear distance.

In some embodiments, the central section 48 is unthreaded section (as shown) and has an outer diameter that is the same as, or larger than, the major diameter 58, 158, 258 of the multi-start external thread 42, 142, 242. In some embodiments, the central section 48 is threaded (not shown) and has an outer diameter defined by a major diameter of the threads that is the same as the major diameter 58, 158, 258 of the multi-start external thread 42, 142, 242.

In some embodiments, the dog point 36 defines an outer diameter 64 which is less than the minor diameter 60, 160, 260. In some embodiments, the outer diameter 64 of the dog point 36 is between about 95.5% to about 99.5% of the minor diameter 60, 160, 260. A radius or chamfer 66, as defined by angle θ, may be provided extending from a front end 68 of the dog point 36.

Figure 2:
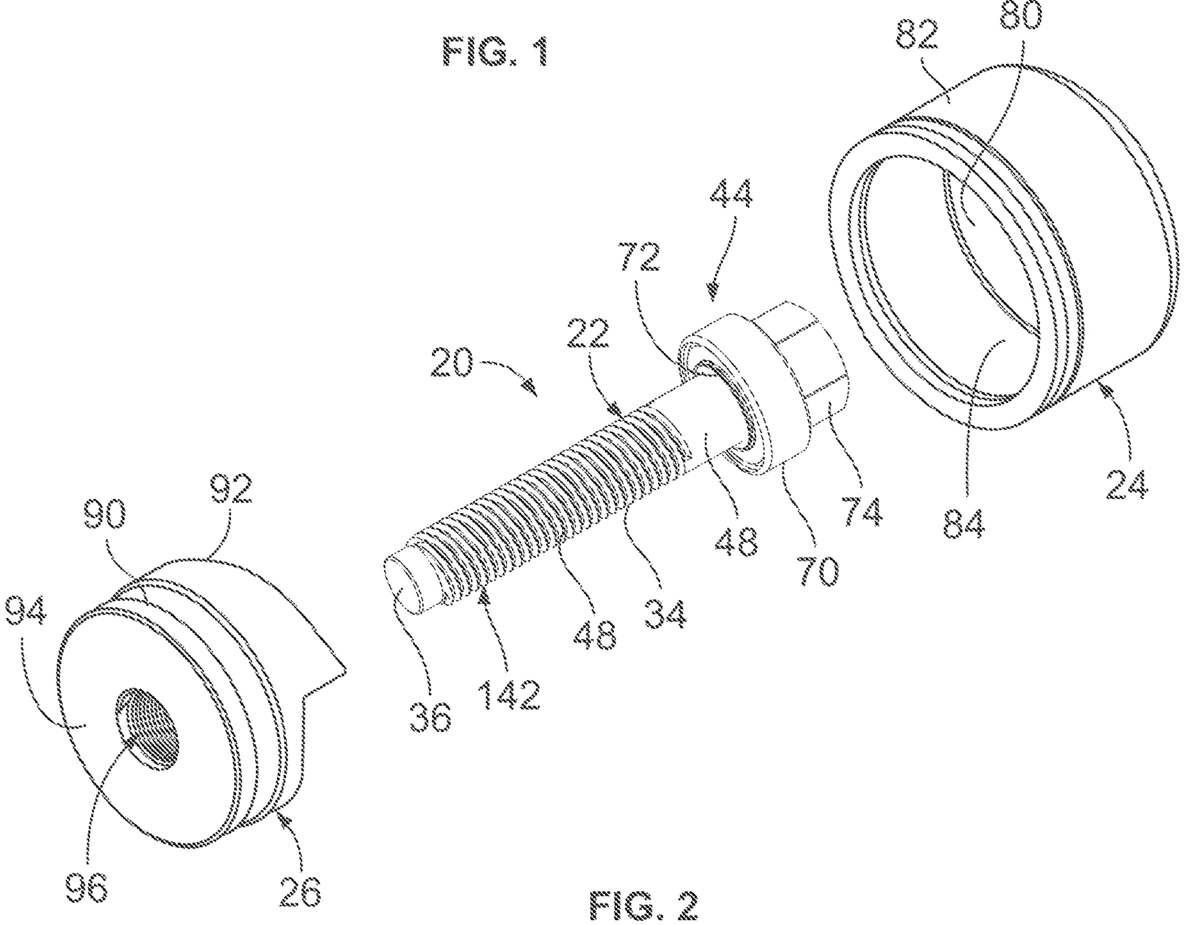
FIG. 2 depicts an exploded perspective view of the punch system, and a bearing of a driver.
Figure 4:
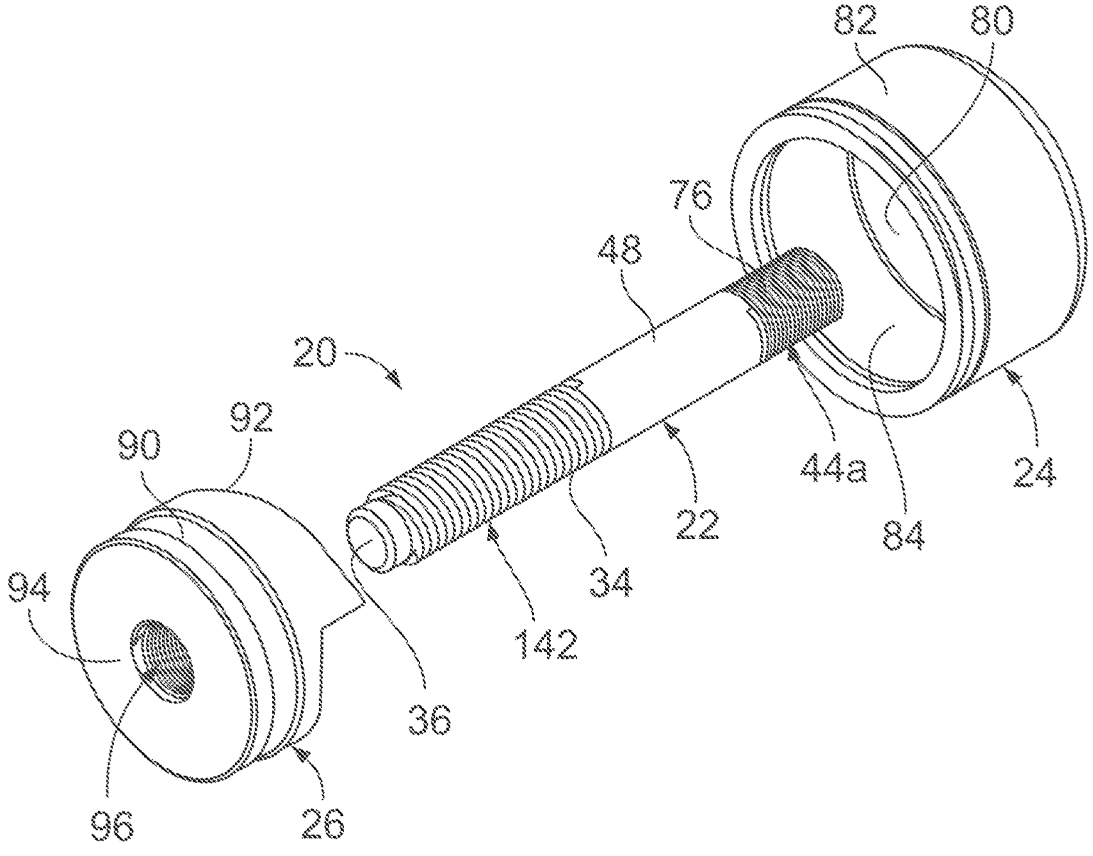
FIG. 4 depicts an exploded perspective view of the punch system of FIG. 3.

In a first embodiment as shown in FIGS. 1 and 2, the driver attachment 44 on the draw stud 22 is suitable for being coupled to a driver 32 formed of a ratchet wrench which includes a bearing 70 as is known in the art. The ratchet wrench is manually actuated. The bearing 70 is positioned on an unthreaded section 72 of the central section 48, and an enlarged head 74 of the draw stud 22 having a plurality of flats is provided at an end of the unthreaded section 72. In use, the bearing 70 is positioned between the enlarged head 74 and the punch 26. The driver 32 couples with the flats on the enlarged head 74 in a known manner. In a second embodiment as shown in FIGS. 3 and 4, the driver attachment 44*a* on the draw stud 22 is suitable for being coupled to a driver 32*a* formed of a hydraulically driven tool. The hydraulically driven tool may be battery powered or manually operated. Examples of such a hydraulically driven tool include, but are not limited to, a Greenlee® Hydraulic Hand Pump, Greenlee® Hydraulic Foot Pump with Hydraulic Knockout Ram. In this embodiment, the driver attachment 44*a* on the draw stud 22 is a single conventional external helical thread 76. The major diameter of the thread 76 forming the driver attachment 44*a* may be the same as, or less than, the outer diameter of the central section 48. Other suitable means may be provided for attaching the driver 32, 32*a* to the draw stud 22 are within the scope of the present disclosure.

The die 24 is conventionally formed and includes a base wall 80 and a circular side wall 82 extending from the outer perimeter of the base wall 80. A recess 84 is provided by the inner surface of the base wall 80 and the side wall 82, and the recess 84 is in communication with an unthreaded central passageway 86 extending through the base wall 80. The central passageway 86 has a diameter which is slightly greater than the outer diameter of the central section 48 of the draw stud 22.

Figure 15:
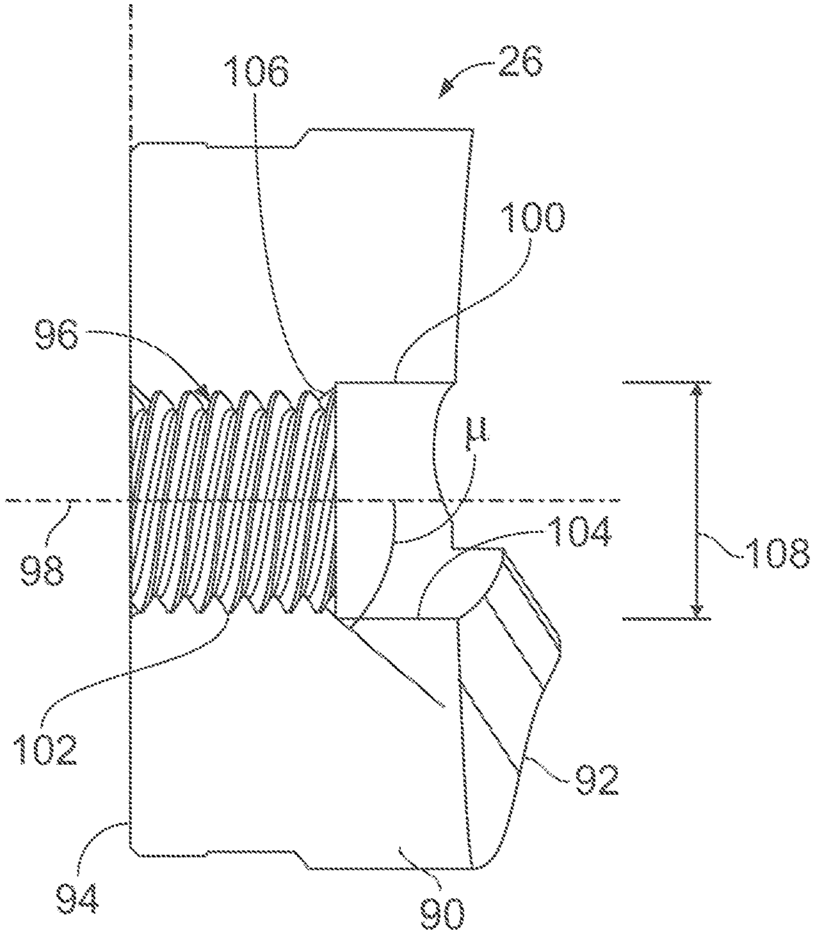
FIG. 15 depicts a cross-sectional view of a punch of the punch system.
Figure 16:
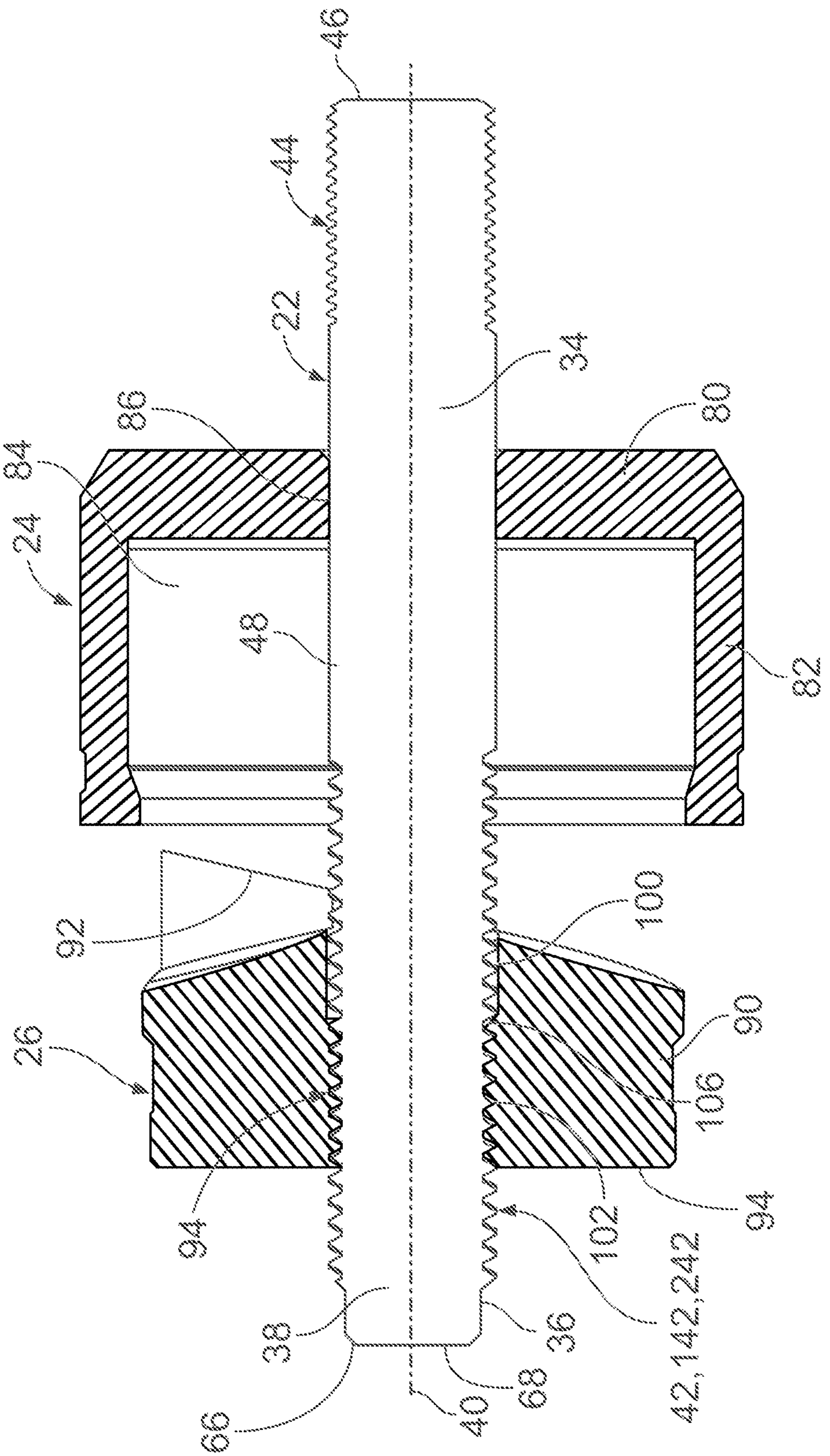
FIG. 16 depicts a cross-sectional view of the punch system.

As shown in FIG. 15, the punch 26 includes a body 90 having a front end 92 formed by a cutting/punching edge as is known in the art and an opposite rear end 94. A wall forming a central passageway 96 extends through the center of the body 90 from the front end 92 to the rear end 94, and a longitudinal centerline axis 98 is defined through the central passageway 96. The passageway 96 has a counterbore 100 extending from the front end 92 to a threaded section 102 which extends to the rear end 94 of the body 90. The counterbore 100 has an unthreaded cylindrical surface 104 which extends from the front end 92 and an unthreaded cone-shaped lead-in surface 106 which extends from a rear end of the cylindrical surface 104 to the threaded section 102. The threaded section 102 is a multi-start internal thread formed by formed by four intertwined coarse helical threads that mirror the threads 50, 52, 54, 56, formed by three intertwined coarse helical threads that mirror the threads 150, 152, 154, or formed by two intertwined coarse helical threads that mirror the threads 250, 252. The cylindrical surface 104 has a diameter 108 which is slightly greater than the major diameter 58, 158, 258 of the multi-start external thread 42, 142, 242. The counterbore 100 is about 2% to about 4% greater than the major diameter 58, 158, 258, and at a depth of between 0.25 and 2 times the magnitude of the major diameter 58, 158, 258.

The threaded section 102 threadedly mates with the multi-start external thread 42, 142, 242. The cone-shaped lead-in surface 106 extends at an angle μ of 45°±5° relative to the centerline axis 98 when viewed in cross-section. Angle μ may be equal to approximately 90°−β.

The coarse helical threads 50, 52, 54, 56, threads 150, 152, 154, or threads 250, 252 on the draw stud 22 are standard Unified coarse threads which maximizes the pitch length of the threads 50, 52, 54, 56, threads 150, 152, 154, or threads 250, 252, while keeping the desired shear strength. By using coarse threads 50, 52, 54, 56, threads 150, 152, 154, or threads 250, 252, the minor diameter 60, 160, 260 of the multi-start external thread 42, 142, 242 is not reduced as occurs when fine threads are used, and as such, the shear strength of the draw stud 22 is not impacted. Typically, when reducing the number of rotations required to move an inch, a fine thread is replaced with a coarse thread to lower the threads per inch and increase the pitch length and lead of the thread. For example, one could change the draw stud 22 from a UNF 0.75-16 to an UNC 0.75-10 thread. In the present disclosure, the multi-start external thread 42, 142, 242 maximizes the distance the punch 26 travels in a single rotation, while maintaining the shear strength of an equivalent single start thread form. This allows for the lead, or linear distance traveled in a single rotation, to be equal to the pitch multiplied by the number of starts. The four-start threads 50, 52, 54, 56 move about four times as far with a single rotation as a single start thread with equal threads per inch, the three-start threads 150, 152, 154 move about three times as far with a single rotation as a single start thread with equal threads per inch, and the two-start threads 250, 252 move about two times as far with a single rotation as a single start thread with equal threads per inch. Since the threads per inch was not lowered to obtain the desired linear distance per rotation, the shear strength characteristics of a typical UNF thread is maintained. As such, the multi-start thread 42, 142, 242 reduces the number of rotations need to fully fasten the punch 26 to the draw stud 22. This coarse thread pitch increases the travel distance of its respective UNF thread equivalent, while maintaining the internal and thread shear strength. This, combined with the multi-start thread 42, 142, 242, allows for the thread lead to be more than four times the pitch travel distance (coarse pitch multiplied by the number of starts equals distance traveled) for the four-start threads, allows for the thread lead to be more than three times the pitch travel distance (coarse pitch multiplied by the number of starts equals distance traveled) for the three-start threads, and allows for the thread lead to be more than two times the pitch travel distance (coarse pitch multiplied by the number of starts equals distance traveled) for the two-start threads. For example, a four-start thread can move more than four times as far as its UNF single start equivalent, a three-start thread can move more than three times as far as its UNF single start equivalent, and a two-start thread can move more than two times as far as its UNF single start equivalent. Therefore, the speed of assembly of the punch 26 with the draw stud 22 is at least two times faster than a single start thread per hole completion, and the speed of disassembly of the punch 26 from the draw stud 22 is at least two times faster than a single start thread per hole completion.

The friction between the draw stud 22 and the punch 26, combined with the angle α of the intertwined helical threads 50, 52, 54, 56, threads 150, 152, 154, or threads 250, 252, is great enough to resist the reverse rotation of the punch 26 when the draw stud 22 and punch 26 are drawn toward the driver 32, **32*a*. As a result, the punch 26 and the draw stud 22 are self-locking when the punch 26 is threaded onto the draw stud 22. This prevents back-driving of the punch 26 when the draw stud 22** is being rotated.

In the embodiment which provides four intertwined coarse helical threads 50, 52, 54, 56, the start of the threading process of threading the punch 26 onto the draw stud 22 is improved over a single start thread since the four intertwined helical threads 50, 52, 54, 56 provide four starts at 90° versus one start at 360°, however, more torque is required versus a single thread. In the embodiment which provides three intertwined helical threads 150, 152, 154, the start of the threading process of threading the punch 26 onto the draw stud 22 is improved over a single start thread since the three intertwined helical threads 150, 152, 154 provide three starts at 120° versus one start at 360°, and less torque is required than in the embodiment where four intertwined coarse helical threads 50, 52, 54, 56 are used. In the embodiment which provides two intertwined coarse helical threads 250, 252, the start of the threading process of threading the punch 26 onto the draw stud 22 is improved over a single start thread since the two intertwined helical threads 250, 252 provide two starts at 180° versus one start at 360°, and less torque is required than in the embodiment where three intertwined coarse helical threads 150, 152, 154 are used.

The geometry of the dog point 36 and the counterbore 100 assists in the alignment of the draw stud 22 with the punch 26 and assists in preventing cross threading of the punch 26 and the draw stud 22. In an embodiment, the dog point 36 has a length of ¾" for both a 7/16-14 draw stud 22 and for a ¾-10 draw stud 22. This provides sufficient length to align the draw stud 22 to the punch 26 and for part stability. Since the diameter 64 of the dog point 36 is reduced relative to the minor diameter 60, 160, 260 of the multi-start external thread 42, 142, 242 and the cone-shaped lead-in surface 62, 162, 262 is provided, this maximizes the area of the thread transition on cut thread transitions. The angle μ of the unthreaded cone-shaped lead-in surface 106 is the same as the angle ß of the cone-shaped lead-in surface 62, 162, 262 (45°±5°). The combination of the transition angles and the dog point 36/counterbore 100 maximize the surface area contact of the threads 50, 52, 54, 56, the threads 150, 152, 154 or the threads 250, 252 with the threaded section 102 of the punch 26.

The provision of the dog point 36, the cone-shaped lead-in surface 62, 162, 262, and the geometry of the threads 50, 52, 54, 56, the threads 150, 152, 154, or the threads 250, 252 makes the punch 26 resistant to cross threading. The ease of function to assemble the punch 26 with the draw stud 22 is independent of the manufacturing process used to manufacture the punch 26 and draw stud 22. The threads 50, 52, 54, 56, the threads 150, 152, 154, or the threads 250, 252 can be created by forming the geometry or cutting the geometry works. Typically, internal threads are single point cut, or tapped, and external threads can be single point cut or roll threaded. The cone-shaped lead-in surface 62, 162, 262 and the counterbore 100 are machined independently of the threading operation making the mating surfaces compatible without concern of the processes utilized.

When the draw stud 22 is inserted into the punch 26, the cone-shaped lead-in surface 62, 162, 262 may engage with the central passageway 96 at the front end 92 and this causes the draw stud 22 to move inward toward the centerline axis 98 of the punch 26. As the draw stud 22 is further inserted into the punch 26, the cone-shaped lead-in surface 62, 162, 262 may engage with the cone-shaped lead-in surface 106 which causes the draw stud 22 to move until the centerline axis 40 of the draw stud 22 aligns with the centerline axis 98 of the punch 26. The cone-shaped lead-in surface 62, 162, 262 helps to align by creating a larger surface contact between the interface of the draw stud 22 and the punch 26.

Coarse threads are typically used in applications where a large torque load is generated and thread stripping or thread damage can result. This coarse pitch form is desirable for punching knockout applications, because the force used in punching are greatest in large diameter knockouts or in thicker plate steel. Coarse pitch threads have a deeper thread profile and the multi-start thread has a smaller thread start geometry. The cone shapes of the lead-in surface 62, 162, 262 and the lead-in surface 106 deter misalignment of the matching thread profiles and better expose the thread start. This allows for the multi-start lead thread starts to find the prospective mating parts start. Multi-start threads have a tendency to cross-thread, making it difficult for the operator to begin assembly. With the present geometry, the dog point 36 finds the center of the passageway 96 of the punch 26, while the cone-shaped lead-in surface 62, 162, 262 completes the thread alignment process by axially aligning the draw stud 22 and the punch 26 together.

Figure 14:
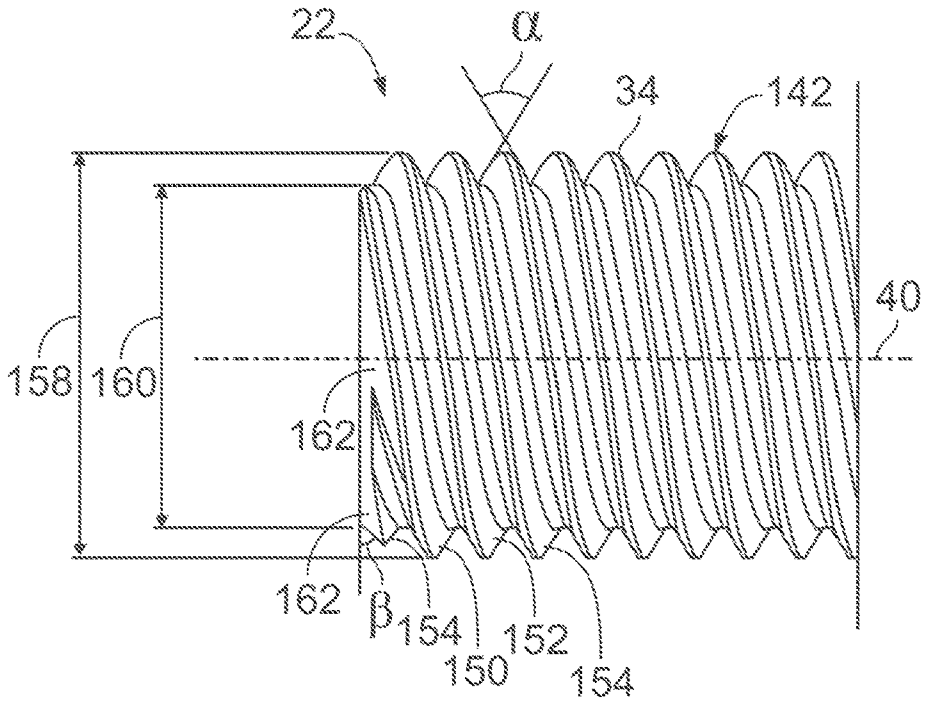
FIG. 14 depicts a side elevation view of a portion of the draw stud of FIG. 9 according to another embodiment.

In an embodiment as shown in FIG. 14, the dog point 36 is eliminated. In this embodiment, during assembly of the draw stud 22 with the punch 26, the cone-shaped lead-in surface 62, 162, 262 engages with the passageway 96 at the front end 92 and this causes the draw stud 22 to move inward toward the centerline axis 98 of the punch 26. As the draw stud 22 is further inserted into the punch 26, the cone-shaped lead-in surface 62, 162, 262 engages with the cone-shaped lead-in surface 106 which causes the draw stud 22 to move until the centerline axis 40 of the draw stud 22 aligns with the centerline axis 98 of the punch 26. The cone-shaped lead-in surface 62, 162, 262 helps to align by creating a larger surface contact between the interface of the draw stud 22 and the punch 26.

Figure 17:
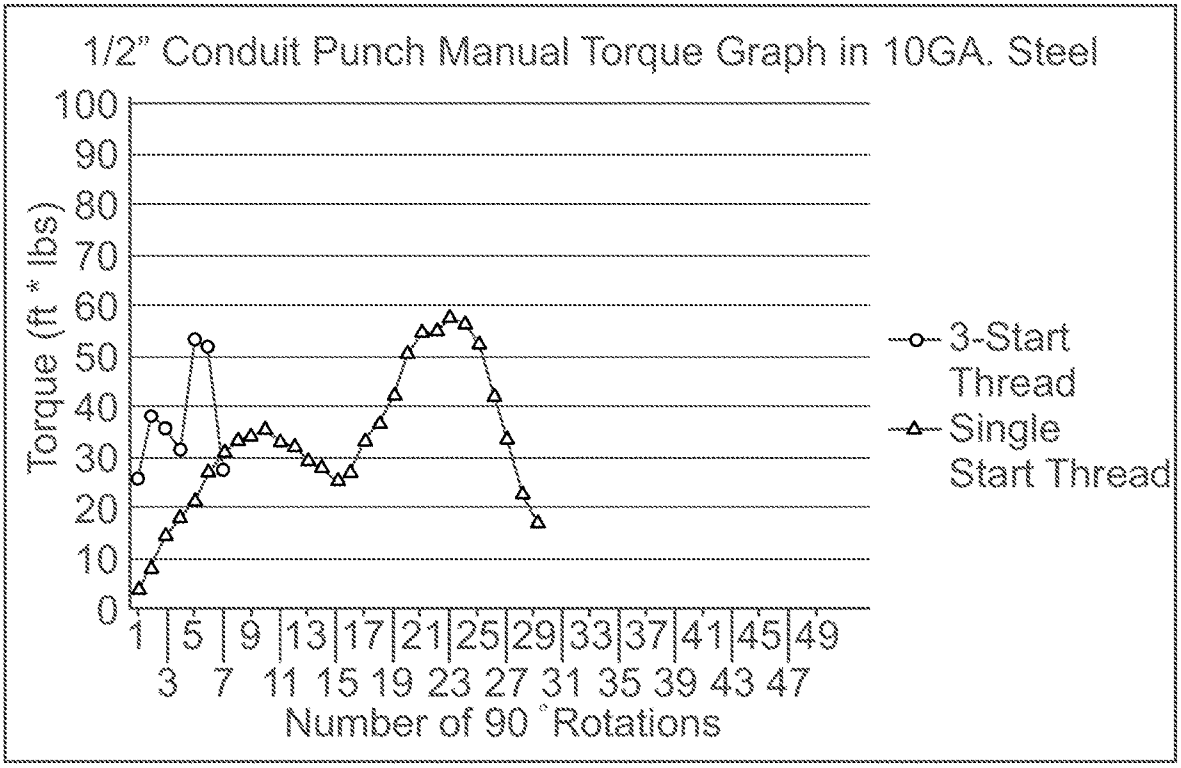
FIGS. 17-22 depict manual torque graphs.
Figure 18:
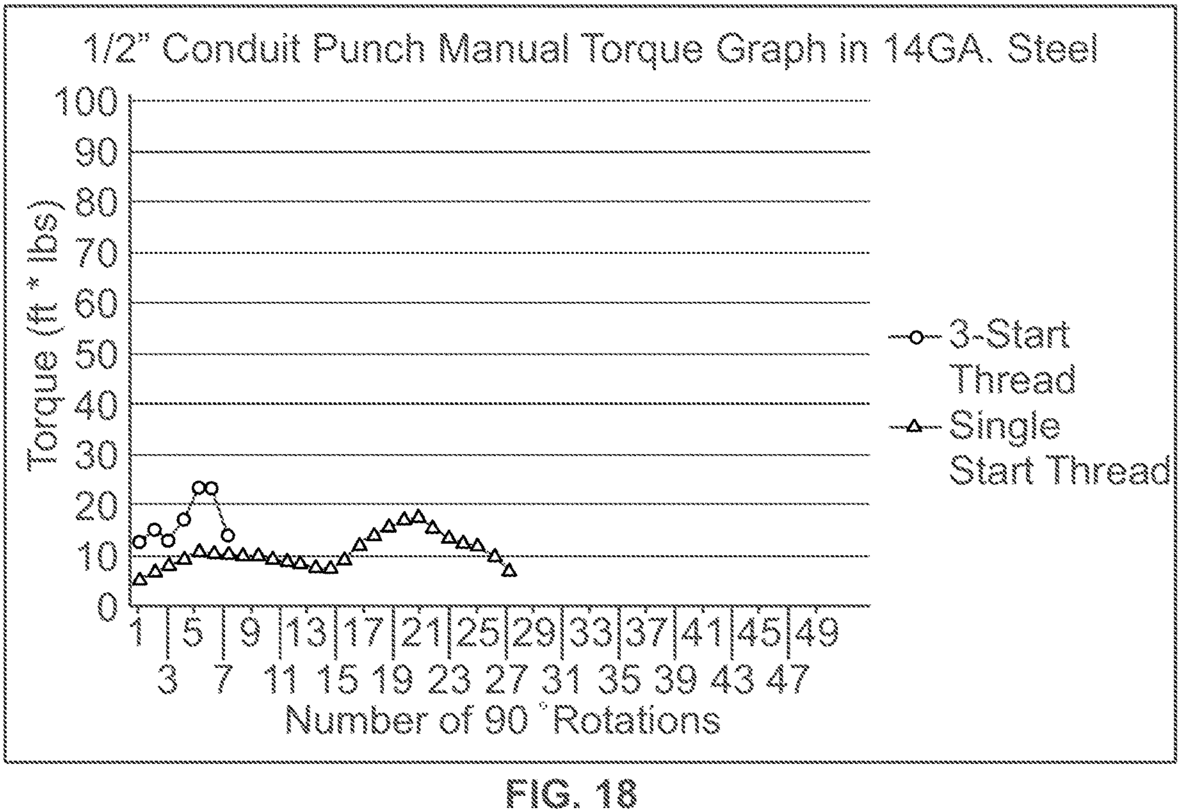
Figure 19:
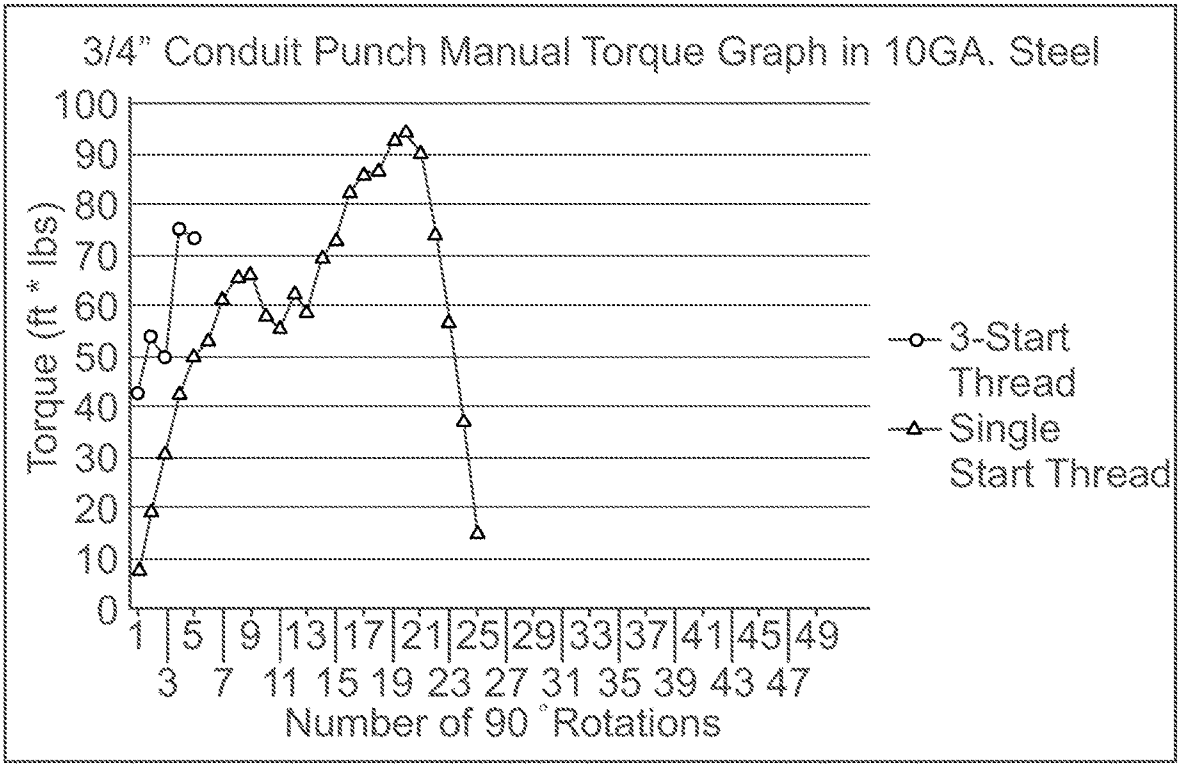
Figure 20:
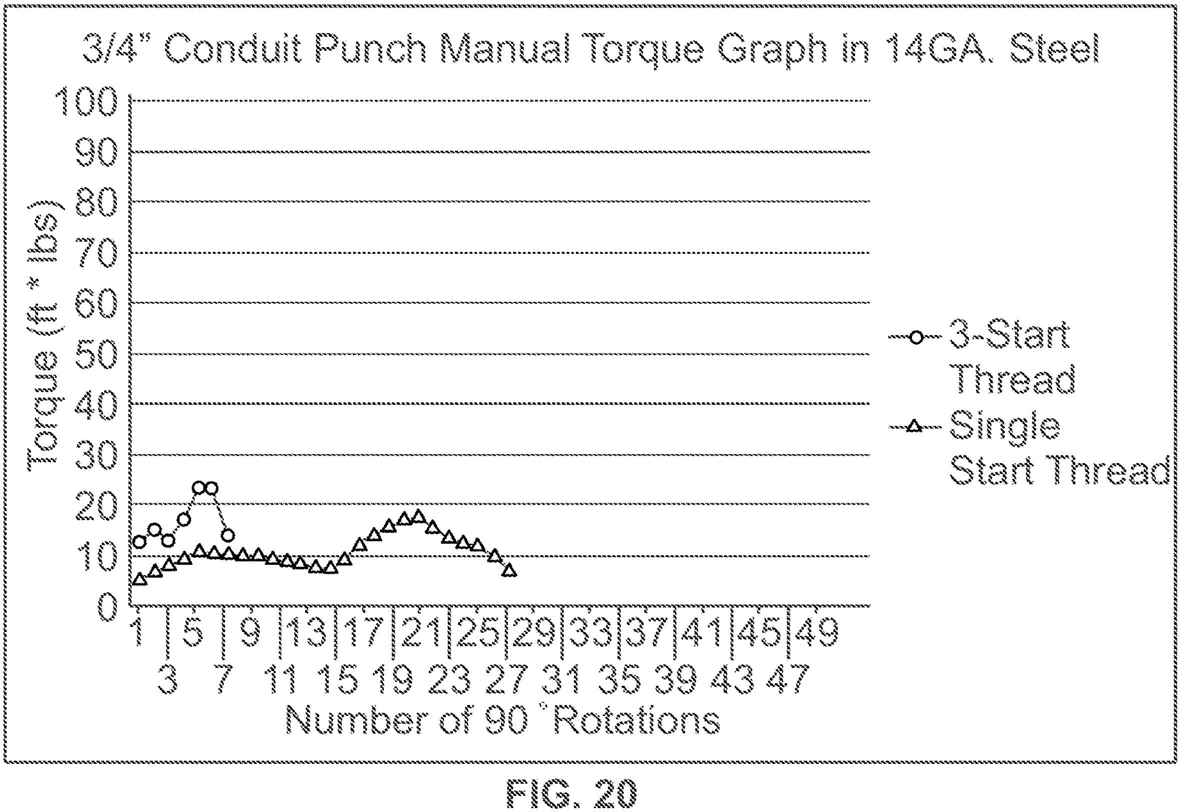
Figure 21:
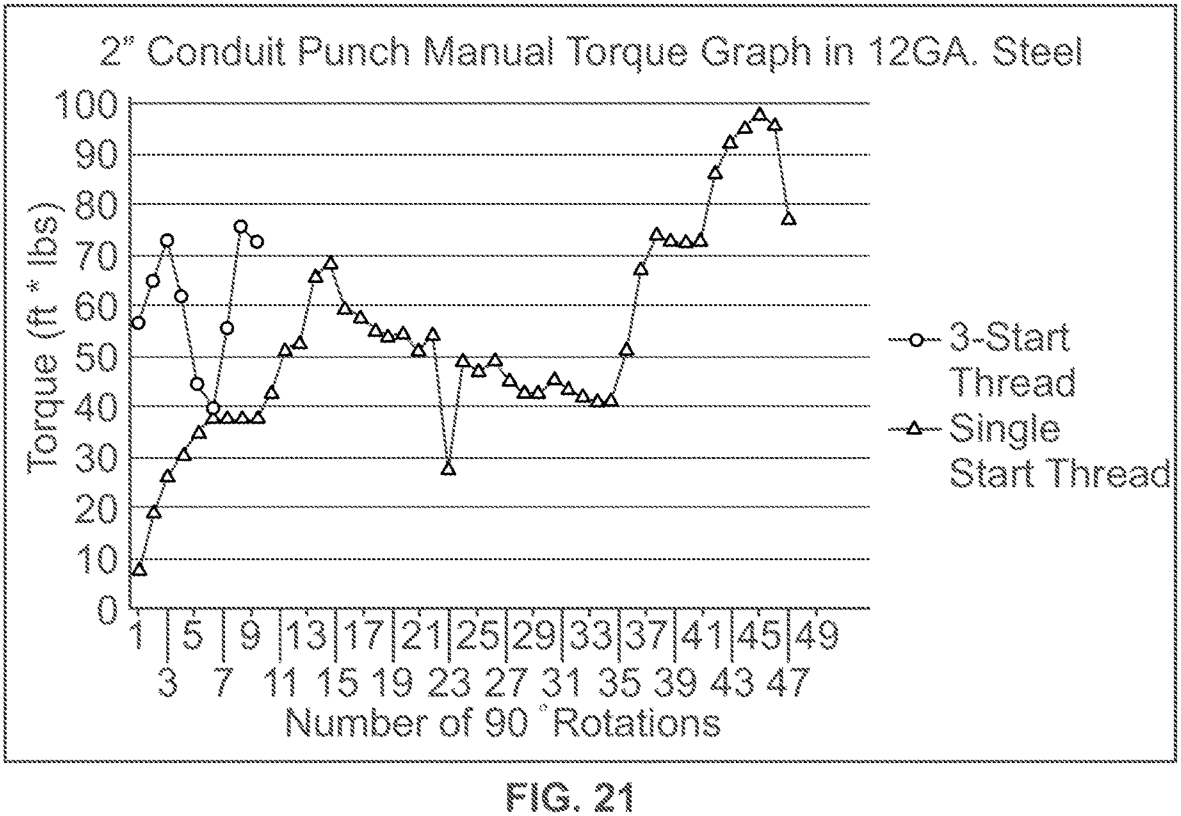
Figure 22:
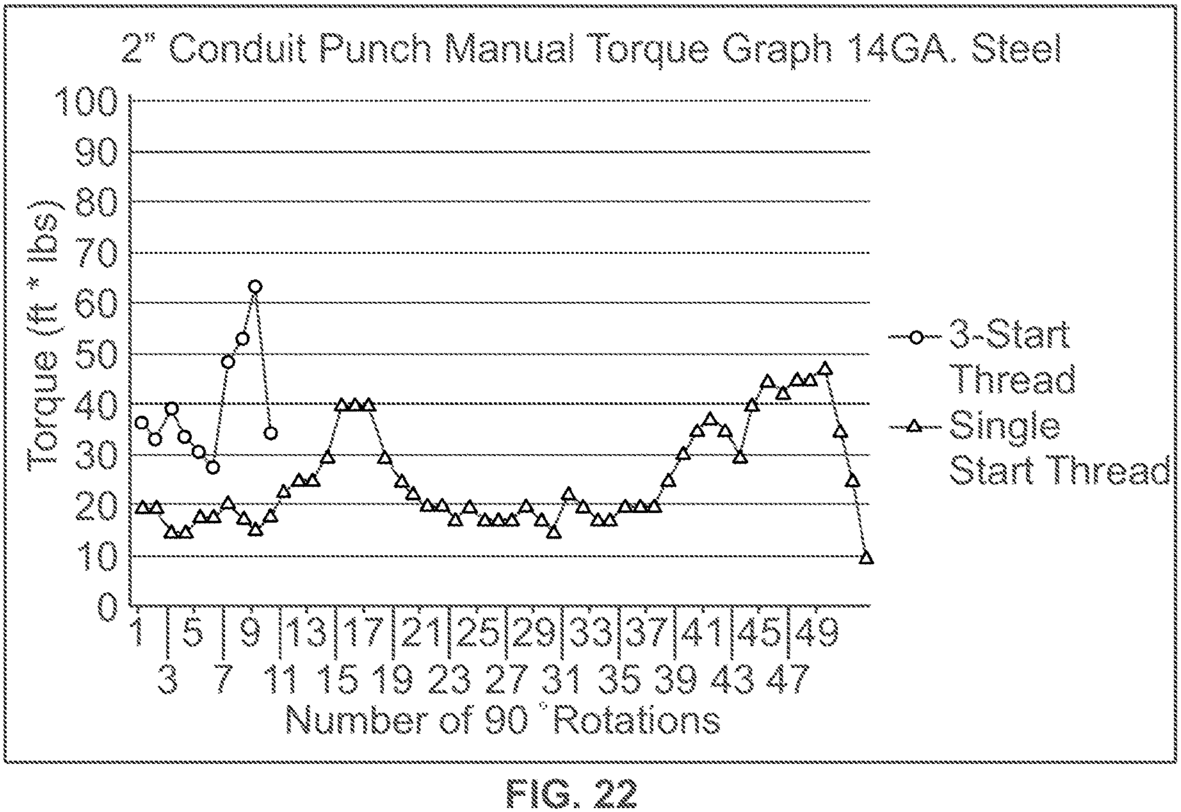

FIGS. 17-22 depict graphs showing the torque output of three different sizes of punches 26, namely a ½" punch 26 (FIGS. 17 and 18), a ¾" punch 26 (FIGS. 19 and 20), and a 2" punch 26 (FIGS. 21 and 22) over the number of 90° rotations. Each graph depicts the three-start thread 142 and a single start thread. Mild steel plate was used, and the graphs show the operator manually rotating the driver 44 90° for each turn. A torque transducer was used to read the torque output at each rotational interval. FIGS. 17, 19 and 21 show graphs of the results which had the thickest plate (10 GA and 12 GA) tested. FIGS. 18, 20 and 22 show graphs of the results which had the thinner plate (14 GA) tested. Steel plate was not used for the 2" punch test for the 10 GA. As shown in each graph, the maximum amount of torque was generated in a much fewer number of rotations using the multi-start external thread 142 versus a single thread (this holds true for the other multi-start threads 42, 242). As shown in the graphs, when a hole is made in the thicker steel, FIGS. 17, 19 and 21, the multi-start thread 142 has a lower peak torque during manual hole-making than the prior art single start thread. The overall work for making a hole with the multi-start thread 42, 142, 242 is less than the single start thread because of the dramatically fewer turns that the operator needs to turn in order to make the hole.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A combination which is configured for use in punching holes in sheet metal comprising:

a punch including a body having a punching edge and a passageway therethrough, the passageway having intertwined coarse helical threads formed thereon; and a draw stud comprising an elongated cylinder having intertwined coarse helical threads thereon which are configured to be coupled to the intertwined coarse helical threads of the punch, wherein a number of the intertwined coarse helical threads provided on the punch corresponds to a number of the intertwined coarse helical threads provided on the draw stud, and the intertwined coarse helical threads on the punch are engaged with the intertwined coarse helical threads on the draw stud in use.

2. The combination of claim 1, wherein the intertwined coarse helical threads of the punch comprises two, three or four intertwined threads.

3. The combination of claim 1, wherein the draw stud further includes an unthreaded dog point extending from the elongated cylinder, the dog point having a diameter which is less than a minor diameter of the intertwined coarse helical threads of the draw stud.

4. The combination of claim 3, further comprising a generally cone-shaped lead-in surface at a front end of the intertwined coarse helical threads of the draw stud, and wherein the passageway of the punch includes a counterbore having an unthreaded cylindrical surface extending from a front end of the punch and a cone-shaped lead-in surface extending between the cylindrical surface and the intertwined coarse helical threads of the punch, the cone-shaped lead-in surfaces having the same angles.

5. The combination of claim 1, further comprising a generally cone-shaped lead-in surface at a front end of the intertwined coarse helical threads of the draw stud, and wherein the passageway of the punch includes a counterbore having an unthreaded cylindrical surface extending from a front end of the punch and a cone-shaped lead-in surface extending between the cylindrical surface and the intertwined coarse helical threads of the punch, the cone-shaped lead-in surfaces having the same angle.

6. The combination of claim 1, in combination with a die mounted on the draw stud.

7. The combination of claim 6, in combination with a manually driven wrench or a hydraulic driver coupled to the draw stud and configured to be engaged with the die.

8. The combination of claim 7, wherein the draw stud has a single thread thereon to which the manually driven wrench or the hydraulic driver is coupled.

9. The combination of claim 1, wherein each coarse helical thread has a thread angle defined by a 60° included thread form.

10. A method of punching a hole comprising:

attaching a die to a draw stud;

inserting a free end of the draw stud through sheet metal;

engaging a multi-start thread of a knockout punch with a multi-start thread of the draw stud, wherein a number of starts provided on the punch corresponds to a number of starts provided on the draw stud;

rotating the knockout punch to thread the knockout punch onto the free end of the draw stud; and moving the draw stud and the knockout punch toward the die to puncture and cut the sheet metal.

11. The method of claim 10, wherein the knockout punch is manually rotated onto the draw stud.

12. The method of claim 10, further comprising engaging an unthreaded dog point of the draw stud with the punch, wherein the engagement of the dog point occurs prior to engagement of the multi-start thread of the knockout punch with the multi-start thread of the draw stud.

13. The method of claim 10, further comprising engaging a generally cone-shaped lead-in surface of the draw stud with the punch, wherein the engagement of the generally cone-shaped lead-in surfaces occurs prior to engagement of the multi-start thread of the knockout punch with the multi-start thread of the draw stud.

14. The method of claim 12, further comprising engaging a generally cone-shaped lead-in surface of the draw stud with the punch, wherein the engagement of the generally cone-shaped lead-in surfaces occurs engagement of the dog point and prior to engagement of the multi-start thread of the knockout punch with the multi-start thread of the draw stud.

15. A combination which is configured for use in punching holes in sheet metal comprising:

a punch including a body having a punching edge and a passageway therethrough, the passageway having intertwined standard Unified coarse threads formed thereon; and a draw stud comprising an elongated cylinder having intertwined standard Unified coarse threads thereon which are configured to be coupled to the intertwined standard Unified coarse threads of the punch, wherein a number of the intertwined standard Unified coarse threads provided on the punch corresponds to a number of the intertwined standard Unified coarse threads provided on the draw stud, and the intertwined standard Unified coarse threads on the punch are engaged with the intertwined standard Unified coarse threads on the draw stud in use.

16. The combination of claim 15, wherein the intertwined standard Unified coarse threads of the punch comprises two, three or four intertwined threads.

17. The combination of claim 15, wherein the draw stud further includes an unthreaded dog point extending from the elongated cylinder, the dog point having a diameter which is less than a minor diameter of the intertwined standard Unified coarse threads of the draw stud.

18. The combination of claim 17, further comprising a generally cone-shaped lead-in surface at a front end of the intertwined standard Unified coarse threads of the draw stud, and wherein the passageway of the punch includes a counterbore having an unthreaded cylindrical surface extending from a front end of the punch and a cone-shaped lead-in surface extending between the cylindrical surface and the intertwined standard Unified coarse threads of the punch, the cone-shaped lead-in surfaces having the same angles.

19. The combination of claim 15, further comprising a generally cone-shaped lead-in surface at a front end of the intertwined standard Unified coarse threads of the draw stud, and wherein the passageway of the punch includes a counterbore having an unthreaded cylindrical surface extending from a front end of the punch and a cone-shaped lead-in surface extending between the cylindrical surface and the intertwined standard Unified coarse threads of the punch, the cone-shaped lead-in surfaces having the same angle.

20. The combination of claim 15, in combination with a die mounted on the draw stud.

21. The combination of claim 20, in combination with a manually driven wrench or a hydraulic driver coupled to the draw stud and configured to be engaged with the die.

22. The combination of claim 21, wherein the draw stud has a single thread thereon to which the manually driven wrench or a hydraulic driver is coupled.

23. The combination of claim 15, wherein each standard Unified coarse thread has a thread angle defined by a 60° included thread form.

* * * * *